United States Patent [19]

Mandle et al.

[11] Patent Number: 4,829,441

[45] Date of Patent: May 9, 1989

[54] METHOD FOR DETERMINING THE AIR SPEED OF A HELICOPTER, SYSTEM FOR CARRYING ON THIS METHOD AND METHOD FOR CALIBRATING SUCH AIR SPEED DETERMINING METHOD AND SYSTEM

[75] Inventors: Jacques Mandle, Granges les Valence; Jean-Claude Goudon, Chabeuil, both of France

[73] Assignee: Crouzet - A French "Societe Anonyme", Paris, France

[21] Appl. No.: 63,534

[22] Filed: Jun. 18, 1987

[30] Foreign Application Priority Data

Mar. 26, 1987 [FR] France ................................ 87 04258

[51] Int. Cl.$^4$ ..................... B64C 11/34; G06F 15/329
[52] U.S. Cl. .................... 364/434; 364/565; 364/571.02; 244/17.13
[58] Field of Search ............... 364/434, 433, 565, 571; 244/17.13, 17.15; 318/584

[56] References Cited

U.S. PATENT DOCUMENTS

| | | | |
|---|---|---|---|
| 4,005,835 | 2/1977 | Gerstine et al. | 364/432 |
| 4,300,200 | 11/1981 | Doe | 364/565 |
| 4,371,936 | 2/1983 | Adams et al. | 364/434 |
| 4,382,283 | 5/1983 | Clefford et al. | 364/434 |
| 4,553,210 | 11/1985 | Centula | 364/434 |
| 4,603,389 | 7/1986 | Griffith et al. | 364/434 |
| 4,628,455 | 12/1986 | Skutecki | 364/434 |

FOREIGN PATENT DOCUMENTS 2282644 3/1976 France.

OTHER PUBLICATIONS

Bramwell et al, "Helicopter Dynamics," 1976, Edward Arnold (Publishers) Ltd.
Faulkner, "Flight Investigations of a Helicopter Low Air Speed Estimation System Based on Measurement of Control Parameters", 9/16/80, 6th European Rotorcraft & Powered Lift Aircraft Forum, paper 41.
Mandle, "A New Internal Low Airspeed System for Helicopters," Aerospace Division Crouzet, no date available.
Faulkner, "A Method of Helicopter Low Airspeed Estimation Based on Measurement of Control Parameters," 5th European Rotorcraft & Powered Lift Aircraft Forum.

Primary Examiner—Parshotam S. Lall
Assistant Examiner—Thomas G. Black
Attorney, Agent, or Firm—Lowe, Price, Leblanc, Becker & Shur

[57] ABSTRACT

The air speed is determined by solving the equation $$V_{x,y} = k_1(P_{x,y} - \theta_{x,y}) + k_7 P_{x,y}^2 + k_8 P_{x,y} P_z + k_4 P_{y,x} + k_5 \theta_{y,x} + k_2 P_z + k_9 \gamma_z + k_3 P_o + k_6 P_o^2 + k_{10},$$

in which $P_z$ is the pitch of the antitorque device, $\gamma_z$, the vertical acceleration of the helicopter, $k_1$–$k_{10}$, parameters depending on the type of helicopter, $p_{x,y}$, the longitudinal or transverse cyclic pitch, $p_o$ the collective pitch of the main rotor, $\theta_{x,y}$ the angle of bank of the helicopter about the transverse or longitudinal axis of the helicopter. The system for determining the air speed may also include a conventional anemometer for hybridization with the computed speed. The parameters $k_1$–$k_{10}$ are determined by self-calibration and by assuring that the variations of the ground speed and of the air speed are the same from one flight configuration to another one of a pair of flight configurations, among a series of pairs, for which the sensiting parameters of the helicopter are measured in the earth's reference by means of an airborne ground speed reference.

10 Claims, 7 Drawing Sheets

METHOD FOR DETERMINING THE AIR SPEED OF A HELICOPTER, SYSTEM FOR CARRYING ON THIS METHOD AND METHOD FOR CALIBRATING SUCH AIR SPEED DETERMINING METHOD AND SYSTEM

BACKGROUND OF THE INVENTION

1. Field of the Invention

The present invention relates first of all to a method for determining the speed of a helicopter with respect to the mass of air in which it moves as well as a system for determining this speed, which is the true air speed of the aircraft. From the aerodynamic point of view, it is the speed which is important for safety reasons especially. From the navigational point of view, it is the ground speed which should be taken into account. Without wind, it is the same. If there is a wind, it is necessary to take into account the effective wind and the cross wind and to make the necessary corrections.

In its general plane a helicopter has a longitudinal axis OX and a transverse axis OY. The blades of the helicopter forming the rotor disk, or main lift rotor, are articulated to a hub extending along an axis OZ, often perpendicular to the two axes OX and OY. The movement of the helicopter in the plane OX, OY as well as in altitude along OZ takes place by varying the pitch, or setting, of the blades of the rotor, that is to say by rotation of the blades about their foot, or about the articulation fixing them to the hub. The setting angle of the blade is the angle which the zero lift chord of its profile makes with the plane of rotation.

The setting of the blades is determined by means of a cyclic pitch control plate, or swash plate. This plate, in fact a double plate, may be driven in translation along the axis OZ by a first control and in rotation about the axes OX and OY by a piloting lever called swash lever. The swash plate is then formed of two plates, substantially joined together, the upper plate being however mounted for rotation with the rotor disk, the lower plate, in this respect, being fixed. The blades are connected to the upper plate by a pitch link fixed to its leading edge.

By rotating or slanting the swash plate about the axes OX and OY by translation thereof along the axis OZ, the setting of the blades may then be varied through the pitch links.

By actuating the first control, called "collective lever," the pilot drives the swash plate in translation along the OZ axis, this resulting in the variation of the setting of all blades simultaneously by a same angle. This is how the pilot makes the lift to vary and thus the altitude of the helicopter. By actuating the swash lever, and through a direct connection between this latter and the fixed plate of the swash plate, which connection is for example of the mechanical or hydraulic type with a gimbal or universal fitting, the pilot causes the swash plate to slant about one or other of the two axes OX and OY or both. On the side where the plates is slanted downwards, the edge of the blades is pulled downwards, which reduces their lift. The blades, mobile about their articulation, then have a tendency to drop. On the other side, it is the reverse. It is then by actuating the swash lever that the pilot orientates in space the lift of the rotor disk and thus controls the movements of his aircraft in the horizontal plane.

No instrument gives accurately the true air speed of a helicopter for every flight envelope.

2. Description of the Prior Art

The solution is known provided by the Badin anemometer or aircraft solution, which gives the modulus of a speed as a function of the difference between the static or atmospheric pressure and the total pressure acquired by a Pitot tube perpendicular to the relative wind. But the speed shown by a Badin anemometer is only equal to the true air speed if the static pressure is equal to 1013 mbar in a standard atmosphere, therefore close to the ground. As the helicopter rises in altitude, the static pressure decreases and the indicated speed becomes less than the true air speed, of the order of 1% per 600 feet from the ground. Furthermore, below a certain speed, about 40 knots, the dynamic pressure is too low and the lift rotor generates an aerodynamic flow causing an apparent air speed approximating the vertical and leading to aerodynamic angles of attack which are incompatible with the use of Pitot tubes and also disturbing the static pressure measurements.

The solution is also known which improves the preceding one for low speeds and uses a Pitot tube mounted, at the end of a long mast, on a vane, gimballed for movement about the transverse axis OY and the vertical of the tube, so that the total pressure taking tube is oriented in the direction of the local aerodynamic field. This solution is then more accurate than the first, but only at low speeds. Furthermore, it rests on a fragile vulnerable and complicated installation because of the gimbal mounting, and so unreliable.

A third solution is further known consisting in disposing, at both ends of an arm mounted for rotation on a foot, two pressure taking venturis—two Kniel tubes—whose difference is a sinusoidal function of the azimuth of the arm. The maximum value of this pressure difference and the corresponding azimuth give respectively the modulus of the air speed and the direction of the speed vector. But it is also a question here of a clumsy and fragile solution and so of only relative reliability.

The solution is also known provided by a probe, formed of two electrodes between which flows an ion flux by corona effect, situated on a mast above the hub of the main rotor. Thus the values of the longitudinal speed and of the lateral speed may be obtained by measuring the deflection of the ion flux. But it is a clumsy and difficult solution to use in a humid atmosphere.

A fifth solution, and there are still others, consists in assuming that the air speed of the helicopter along one or other of the above defined axes OX, OY is proportional to the difference between the cyclic pitch along the axis considered and the angle of inclination, or rotation, of the helicopter about the other of the two axes, namely the pitch angle, or pitch attitude, about the axis OY, and the roll range about the axis OX. It should be noted that the angle of rotation of the helicopter about the axis OZ is the yaw angle.

It is this fifth solution which is recommended in the French patent application n° 2 282 644, published on the Mar. 19, 1976, with reference to the passages on page 9, lines 1-8 and 33-35.

The cyclic pitch $P_x$ along the axis OX is the angle formed, in the plane of symmetry XOZ of the fuselage of the helicopter, between the axis of the hub of the rotor and the control axis, perpendicularly to the swash plate, the cyclic pitch $P_y$ being the corresponding angle in the plane YOZ.

This fifth solution is quite satisfactory for flying conditions close to the stationary condition; the system for implementing it is furthermore simple and rapid to calibrate. However, the performances of this latter solution decrease rapidly as soon as the stationary conditions are no longer present, that is to say when the air speeds along axes OX and OY increase.

In short, all the solutions proposed up to now for determining the true air speed of a helicopter suffer from considerable limitations of their correct operating ranges, for some limitations at high speeds and for others at low speeds, and again for other limitations due to disturbances related to the local measurements in the disturbing flux of the rotor and to excessive fragility, even to practical impossibilities related to the need to measure non accessible parameters, such as the efficiency of a rotor, or difficult to measure with satisfactory accuracy, such as the position of the rotor disk, or to the need of complex and costly calibration.

Thus, the present invention provides a method for determining the air speed of a helicopter, performing in all flight envelopes of the aircraft and only using primary information measurements readily obtainable and with safety, and without using means external to the fuselage of the helicopter.

The present invention also provides an efficient method in the low speed flight range and particularly during air manoeuvers, making it compatible with the traditional anemobarometric system, so as to provide continuously and accurately the speed information in all the flight envelope of the helicopter.

SUMMARY OF THE INVENTION

To this end, the present invention provides a method for determining the air speed of a helicopter having a main lift rotor and an antitorque device, with a longitudinal axis OX, a transverse axis OY and an axis of the rotor OZ, a swash plate being provided for varying the longitudinal cyclic pitch Px, the transverse cyclic pitch Py and the collective pitch Po of the main rotor, in which method the two components Vx and Vy of the speed are measured along the axes OX and OY, respectively, as a function of the difference between the cyclic pitch (Px, Py) along the axis considered (OX, OY) and the angle of bank ($\theta x$, $\theta y$) of the helicopter about the other axis (OY, OX), which method is characterized by the fact that Vx and Vy are determined by solving the equations:

$$Vx = k_1(P_x - \theta_x) + k_7 P_x^2 + K_8 P_x P_z + k_4 P_y + k_5 \theta_y +$$
$$k_2 P_z + k_9 \gamma_z + k_3 P_o + k_6 P_o^2 + k_{10}$$

$$Vy = k'_1(P_y - \theta_y) + k'_7 P_x^2 + k'_8 P_x P_z + k'_4 P_x + k'_5 \theta_x +$$
$$k'_2 P_z + k'_9 P_x \theta_y + k'_3 P_o + k'_6 P_o^2 + k'_{10}$$

in which $P_z$ is the pitch of the antitorque device, $\gamma_z$ is the vertical acceleration of the helicopter along the axes OZ, $k_1$–$k_{10}$ and $k'_1$–$k'_{10}$ are parameters, fixed or variable, depending on the type of helicopter and determined by calibration, $P_o$, the collection pitch of the main rotor, controlled by the collective lever of the helicopter participates with $P_x$ and $P_y$ in determining the setting of the blades (see helicopter dynamics, A. R. S. Bramwell, Edward Arnold, 1976.

It should be noted that the method of the invention improves the method described in French Pat. No. 2 282 644 to the extent that the factor multiplying the terms ($P_x - \theta_x$) and $P_y - \theta_y$) is no longer necessarily a constant, on the one hand, and where other terms are taken into account for determining the components of the speed, on the other.

In an interesting implementation of the method of the invention, the parameters $k_1$ and $k'_1$ are given by the relationships:

$$k_1 = \frac{\Omega R}{\frac{4}{3} P_o + \frac{8\omega}{5.7} + \frac{Cd}{\omega}}$$

$$k'_1 = \frac{1}{\frac{4}{3} P_o + \frac{8\omega}{5.7} + \frac{Cd}{\omega}}$$

in which $\Omega$ is the speed of rotation of the main rotor,

R is the radius of the main rotor, $\omega$ is the weight W of the helicopter along the vertical, reduced by the term $\rho nc \Omega R$, Cd is the mean drag of the blades, $\rho$ is the density of the air at the location where the helicopter is situated, n is the number of blades of the main rotor, c is the chord of the blades of the main rotor, the axis OZ of the hub of the rotor being perpendicular to the axes OX, OY.

In this case, it may be advantageous to consider as zero the parameters $k_2$–$k_{10}$ and $k'_2$–$k'_9$ and to take $k'_{10}$ as given by the relationship:

$$k'_{10} = \frac{k \, tr \cos \phi - \sin \theta}{\frac{4}{3} P_o + \frac{8\omega}{5.7} + \frac{Cd}{\omega}}$$

in which k is a constant depending on the type of helicopter, tr is the reduced thrust of the antitorque device, reduced by the terms $\rho nc \Omega^2 R^3$, $\phi$ is the roll angle of the helicopter.

In the preferred way of putting the method of the invention into practice, the parameters $k_1$–$k_{10}$ and $k'_1$–$k'_{10}$ are considered as constants.

The present invention also relates to the system for putting the method of the invention into practice for determining the air speed of the helicopter having a main lift rotor and an antitorque device, with a longitudinal axis OX, a transverse axis OY and an axis of the hub of the rotor OZ, a swash plate being provided for varying the longitudinal cyclic pitch Px, the transverse cyclic pitch Py and the collective pitch Po of the main rotor, which system comprises an accelerometer giving the vertical acceleration $\gamma Z$, along the axis OZ, of the helicopter, inclinometers giving the angles of the tilt $\theta x$ and $\theta y$ of the helicopter about the axes OY and OX, respectively, sensors detecting the movement of the control of the longitudinal Px and transverse Py cyclic pitches, a sensor detecting the movement of the control of the antitorque device Pz, a sensor detecting movement of the control of the collective pitch Po of the main rotor, a device for calibrating the system adapted so as to determine the coefficients $k_1$–$k_{10}$ and $k'_1$–$k'_{10}$ of the relationships giving the values of the longitudinal Vx and transverse Vy components of the air speed of the helicopter, means for storing these coefficients, and a computer adapted for acquiring the parameters $\gamma z$, $\theta x$, $\theta y$, Px, Pz and Po and, by means of said coefficients, implementing said relationships giving Vx and Vy.

The system of the invention may also include a variometer giving the vertical speed Vz of the helicopter and a device for determining the ground speed of the helicopter.

In this case, the system further includes advantageously a conventional anemometer and a hybridization device adapted for selecting one, or the other, or a combination of the two values of the air speed delivered by the computer and the anemometer, respectively.

Incidently, the system of the invention may also include sensors detecting the roll and pitch speeds of the helicopter, the density of the air and the rotational speed of the main rotor of the helicopter.

The present invention finally provides a method for calibrating a system for determining the air speed V of a helicopter of the linear form $$V = \sum_{i=1}^{i=n} a_i x_i,$$

the xi being n variables, representative of different sensitization parameters of the helicopter, to which the n multiplying coefficients $a_i$ are applied, in which method the n coefficients $a_i$ are determined by solving a system of N linear equations with n unknowns of the form $$V = \sum_{i=1}^{n} a_i x_i,$$

N being the number of main flight configurations of the helicopter in which said sensitizing parameters of the helicopter are measured in the reference frame of the helicopter and the values of said N variables $x_i$ are calculated, in which calibration method the true attitude and heading of the helicopter are determined, each main flight configuration is split into a pair of elementary configurations closely related to each other so as to assume that the wind is the same in these two elementary configurations and, for each pair of elementary configurations, the ground speed of the helicopter is measured, in the two elementary configurations, whose variations are assimulated with those of its air speed, as well as the sensitizing parameters of the helicopter, which are transposed from the reference frame of the helicopter into the earth's reference frame and, as equation of the system of N equations to be solved, that one is taken which is obtained by subtracting the equation relative to the two elementary configurations one from the other, in the left and right hand sides of the equation.

With the calibration method of the invention, it is only necessary to use an airborne reference of the ground speed. We can then speak of a self-calibration method.

Advantageously, the system of N equations with n unknowns is solved by the method of least squares.

BRIEF DESCRIPTION OF THE DRAWINGS

The invention will be better understood from the following description of the method of determining the air speed of a helicopter, of the system for putting this determination method into practice and the method for calibrating the system or method for determining the speed, with reference to the accompanying drawings in which.

DESCRIPTION OF THE PREFERRED EMBODIMENTS

The method for determining the air speed of a helicopter, of the invention, is originally based on conventional laws of the mechanics of flight of helicopters. The experience acquired has led to the formulation of new equations, those of the invention, sufficiently representative of helicopter flight, as well as to a simplified expression thereof adapted for practical use in a device for measuring the longitudinal and transverse air speeds of helicopters. Mathematical analysis provides equations relating the two components Vx and Vy of the helicopter to the control and attitude parameters of the helicopter. Following the laws of the mechanics of flight, the forces applied to the helicopter must be broken down vectorially: lift of the main rotor, weight of the aircraft, thrust of the antitorque device and aerodynamic drag.

Thus two relationships are determined each giving the components Vx and Vy of the speed of the helicopter with respect to the air as a function of the kinematic control and attitude data. This data can be readily measured on a helicopter and does not require, in particular, measurements of the tilt of the rotor disk, which are difficult to obtain.

Figure 1:
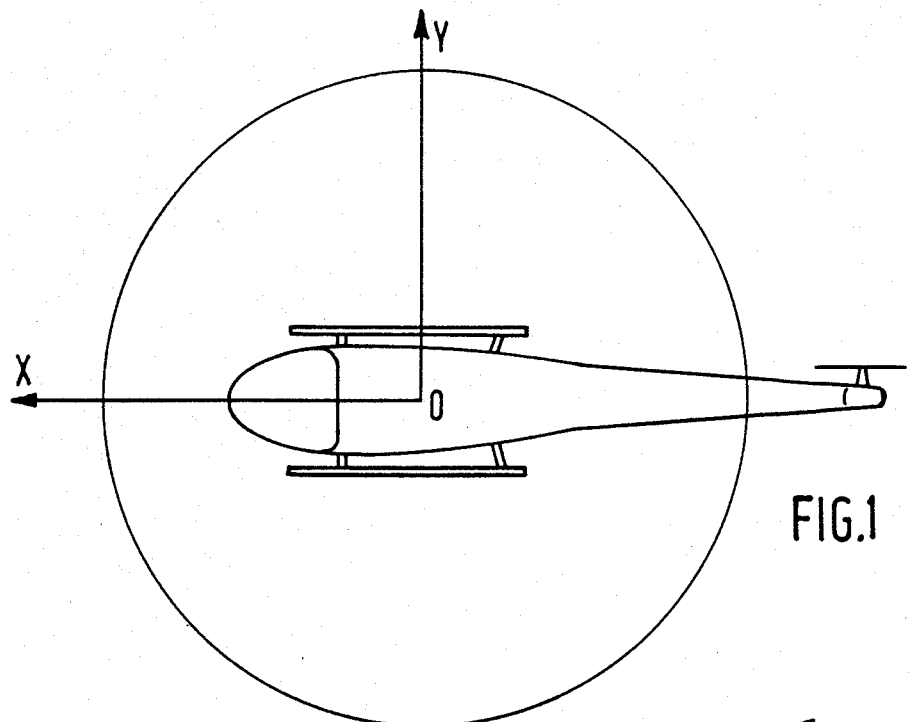
FIG. 1 is a diagram showing the reference axes OX and OY of the helicopter in the horizontal plane.
Figure 2:
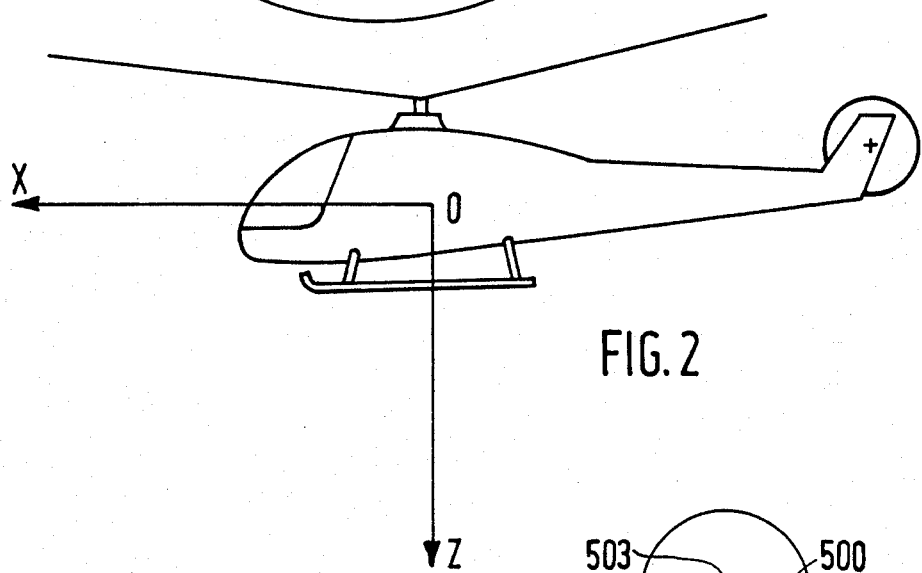
FIG. 2 is a diagram showing the reference axes OX and OZ of the helicopter in the vertical plane.
Figure 3:
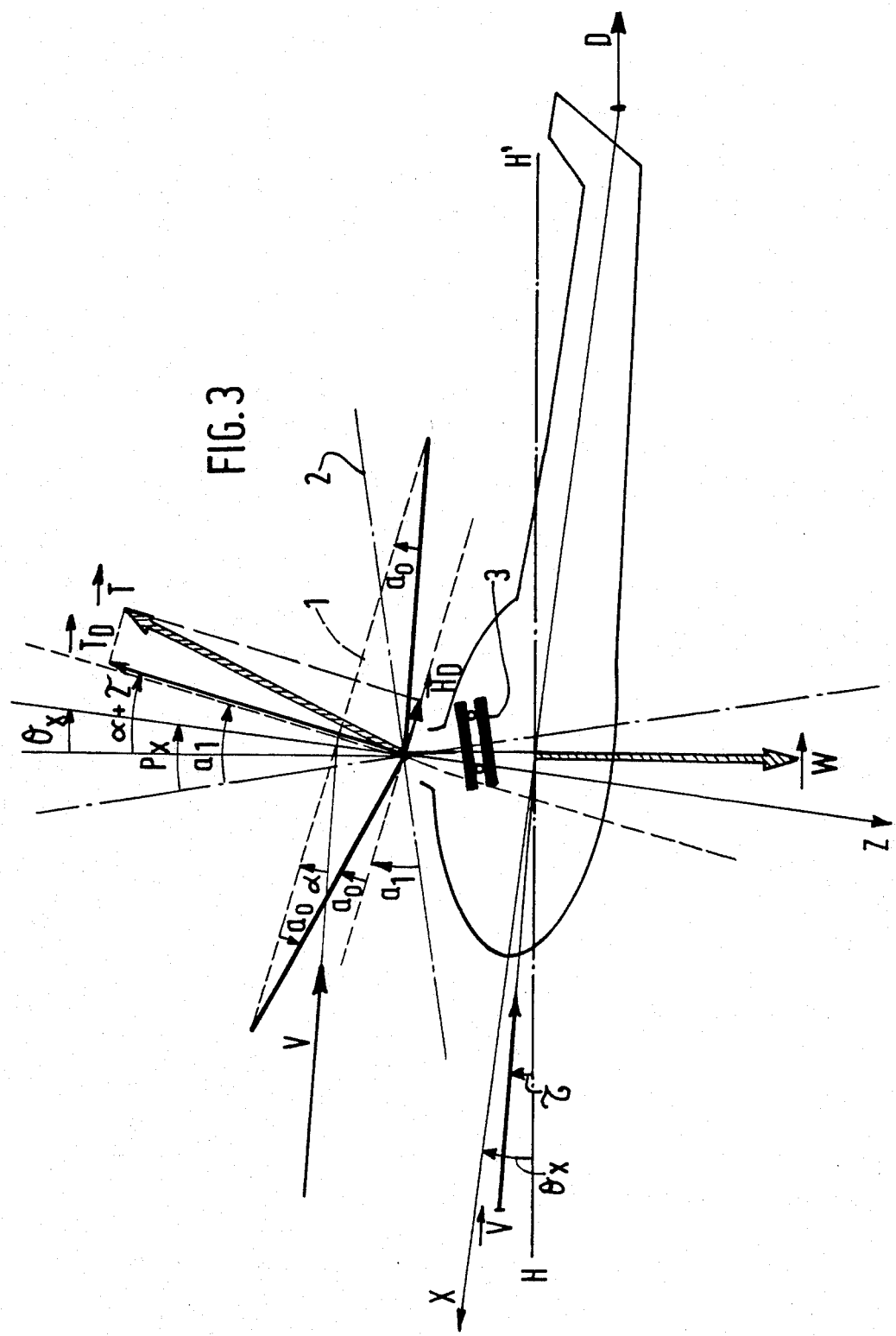
FIG. 3 is a diagram illustrating the breakdown of the forces acting on the helicopter.

FIGS. 1 and 2 illustrate the reference axes OX, OY, OZ of the aircraft, perpendicular to each other in pairs, the axis OZ being the axis of the hub of the main rotor of the aircraft. FIG. 3 illustrates the breakdown of the forces, in the plane of symmetry XOZ of the fuselage of the helicopter, acting on the helicopter when climbing along a slope $\tau$, the angle $\tau$ being formed between the speed vector $\vec{V}$ of the helicopter and the horizontal HH', for determining the component Vx. It is a question of the thrust of the rotor $\vec{T}$, of the weight $\vec{W}$ along the vertical and of the drag of the fuselage $\vec{D}$ in accordance with the speed vector $\vec{V}$. The thrust force of the rotor $\vec{T}$ may be broken down, like any vector, along the axis normal to the plane 1 of the ends of the blades ($\vec{T}_D$) and in this plane ($\vec{H}_D$). This plane forms in space an angle a with the control plane 2, adopted as reference plane, parallel to the swash plate 3, itself controlled directly by the cyclic pitch lever actuated by the pilot and if necessary completed by the action of an automatic pilot or any other appropriate system. This same plane of rotor 1 forms an angle $\alpha_1$ with the air speed vector of the aircraft $\vec{V}$.

The law of inertia states that the vectorial sum of the forces applied to a moving object driven with a rectilinear movement at constant speed is zero. This law projected on the vertical and the horizontal plane, while noting that the rotor plane forms an angle $\alpha+\tau$ with respect to the horizontal, gives the relationships:

$$T_d \cos(\alpha+\tau) - H_d \sin(\alpha+\tau) = W + D \sin\tau$$

$$T_d \sin(\alpha+\tau) + H_d \cos(\alpha+\tau) = D \cos\tau$$

in which $T_D$ is the projection of the thrust of rotor T on the normal to the rotor plane 1 and $H_D$ is the projection of T in this plane 1.

By making the approximations related to the low values of the angles considered, and all calculations being made, the following relationship is derived:

$$\alpha+\tau = -(\tfrac{1}{2}\mu_x^2 d \cos\tau + h_D)/t_D \quad (1)$$

with symbolically:

$$\mu_x = \frac{Vx}{\Omega R},$$

$$d = \frac{D}{\rho \frac{V^2}{2} ncR}$$

$\Omega$ being the speed of rotation of the rotor, R the radius of the rotor, $\rho$ the density of the air in the place where the helicopter is situated, n the number of blades of the rotor and c their chord, $h_D$ and $t_D$ being the values of $H_D$ and $T_D$ divided by the term $\rho nc\Omega^2 R^3$.

In addition, with the following approximations: $t_D = \omega$, $\omega$ being the weight W reduced by the term $\rho nc\Omega^2 R^3$  $h_D = \tfrac{1}{4} Cd\,\mu_x$, Cd being the mean drag of the blades, the relationship (1) becomes:

$$\alpha+\tau = (\tfrac{1}{2}\mu_x^2 d \cos\tau + \tfrac{1}{4}\mu_x Cd)/\omega \quad (3)$$

Referring to FIG. 3, the simple angular relationship exists:

$$\theta_x + P_1 - a_x - \theta + \tau = 0 \quad (4)$$

In fact: $\theta_x + a_1 - P_x = \theta + \tau$, the angle formed between the perpendicular to the rotor plane 1 and the vertical being equal to the angle formed between the rotor plane 1 and the horizontal.

Finally, the complex analysis of the movement of the blades in space, which is outside the scope of this discussion, shows that:

$$a_1 = 2\mu_x\left(\frac{4\omega}{5.7} + \frac{2}{3} Po\right) \quad (5)$$

where the angle Po is the collective pitch.

From the equations (3), (4), and (5) we obtain the following equation (6) of the second degree in $\mu_x$ $$\frac{1}{2}\frac{d}{\omega}\mu_x^2 + \left(\frac{4}{3} Po + \frac{8\omega}{5.7} + \frac{1}{4}\frac{Cd}{\omega}\right)\mu_x + \quad (6)$$

$$(\theta_x - Px) = O$$

which may be solved numerically and give a value of $\mu_x$ so Vx.

From experience, the speed Vx remains low compared with the peripheral speed of the rotor, so $\mu_x$ is small and the (6) may be simplified to the first degree and be solved as:

$$Vx = \frac{\Omega R (Px - \theta x)}{\frac{4}{3} Po + \frac{8\omega}{5.7} + \frac{1}{4}\frac{Cd}{\omega}} \quad (7)$$

This relationship is an important improvement with respect to the prior methods, because the influence of the weight of the helicopter, of the collective pitch and of the speed of rotation of the rotor are made clear therein and so taken into account. It is a question of parameters which can be readily measured.

Calculation of the speed component with respect to the air along the transverse axis Vy takes place in a similar way, while however taking into account the lateral thrust of the antitorque device which is generally itself a rotor. This thrust compensates for the rotational torque of the main rotor whatever the device.

By way of example, for rotor type antitorque device, the thrust is substantially proportional to the pitch Pz of this rotor, except for a constant.

Calculations similar to the preceding one lead to the expression $$Vy = \frac{-(Py - \theta y + \sin\theta y - k\,tr\cos\phi)}{\frac{4}{3} Po + \frac{8\omega}{5.7} + \frac{1}{4}\frac{Cd}{\omega}} \quad (8)$$

where tr is the reduced thrust of the antitorque system, k a constant determined for each type of helicopter and $\phi$ the roll angle of the helicopter.

These relationships (7) and (8) may be further improved for a more accurate computation of the speeds Vx and Vy, by:
—taking into account the normal acceleration of the helicopter, by replacing W by $Wn_z$, $n_z$ being the normal load factor,
—taking into account the pitch and roll rotational speeds.

The use of these new parameters makes the computation of the speeds Vx and Vy exact for unstabilized flight conditions, for example when accelerating or when turning, and lead to devices having much better performances than those of the prior art.

Let us consider then:

$$Vx = jx + jy \cdot jz \quad (9)$$

$$Vy = jy + jz \cdot jz \quad (10)$$

in which equations jx, jy and jz are expressed by the relationships:

$$jx = \frac{l_1 + l_2\,\theta_x + l_3\,P_x + l_{4p} + l_{5q} + l_6\,P_z}{1 + l_7\,P_o + l_8\,M/l} \quad (11a)$$

$$jy = \frac{l'_1 + l'_2\,\theta_y + l'_3\,P_y + l'_{4p} + l'_{5q} + l'_6\,P_z}{1 + l'_7\,P_o + l'_8\,M/l} \quad (11b)$$

$$jz = \frac{l''_1}{1 + l''_2\,P_o + l''_3\,M/l} \quad (11c)$$

in which relationships $l_1$-$l_8$, $l'_1$-$l'_8$, $l''_1$-$l''_3$ are parameters dependent on the type of helicopter, M the weight of the helicopter, p and q the angular speeds respectively when rolling or pitching, Pz the control of the antitorque device, that is to say the pitch if it is a question of a rotor, and $\rho$ the density of the air at the replace where the helicopter is.

This formulation gives excellent results but represents a considerable volume of computations. The volume of computations can be reduced by simplifying the formulae (9) and (10).

This simplified and practical formulation only uses parameters directly accessible using methods well known on helicopters:

$$Vx = k_1 (Px - \theta x) + k_2 Pz + k_3 Po + k_4 Py + k_5 \theta y + \quad (13)$$
$$k_6 Po^2 + k_7 Px^2 + k_8 Pz\, Px + k_9 \gamma z + k_{10}$$
$$Vy = k'_1 (Py - \theta y) + k'_2 Pz + k'_3 Po + k'_4 Px + k'_5 \theta x + \quad (14)$$
$$k'_6 Po^2 + k'_7 Px^2 + k'_8 Po\, Pz + k'_9 Px\, \theta + k'_{10}$$

It will be noted that the equations (7) and (8) are derived from the equations (13) and (14) by taking as value for the parameters $k_2$–$k_{10}$ and $k'_2$–$k'_9$ a zero value, as parameter $k_1$ $$k_1 = \frac{\Omega R}{\frac{4}{3} Po + \frac{8\omega}{5.7} + \frac{Cd}{\omega}}$$

as parameter $k'_1$ $$k'_1 = \frac{-1}{\frac{4}{3} Po + \frac{8\omega}{5.7} + \frac{Cd}{\omega}}$$

and as parameter $k'_{10}$ $$k'_{10} = \frac{1\, tr\, \cos \phi - \sin \theta y}{\frac{4}{3} Po + \frac{8\omega}{5.7} + \frac{Cd}{\omega}}$$

Depending on the type of helicopter and the desired performances, other parameters may be taken into account. These parameters may be more particularly:
— the vertical speed Vz,
— the roll and pitch speeds p and q,
— the reduced weight $M/\rho$,
— the speed of rotation of the main rotor $\Omega$.

Vz, p and q are then introduced into the right hand sides of the equations (13) and (14) in the form:

$$k_{11} Vz + k_{12} p + k_{13} q \text{ and } k'_{11} Vz + k'_{12} p + k'_{13} q.$$

$M/\rho$ is introduced into the same equations by replacing k and k' respectively by:

$$k_1 = h_1 M/\rho + h_2$$
$$k_1' = h'_1 M/\rho + h'_2$$

the coefficients $h_1$, $h_2$, $k'_1$, $k'_2$ being constants for a given helicopter.

The speed of rotation of the main rotor is introduced in the form:

$$k_{14} \Omega + k_{15} \Omega^2 \text{ and } k'_{14} \Omega + k'_{15} \Omega^2$$

respectively in the right hand side of equations (13) and (14).

This improvement is really only necessary in the case where the main rotor of the helicopter either has no system for regulating the rotational speed or has several rotational speeds controlled in another way.

It would be possible to add to the right hand sides of equations (13) or (14) squared terms, even a whole power for the terms $\theta x$, Px, Pz, Py, $\theta y$ and $\theta z$, even products of these parameters, for example ($\gamma z\, Po$), multiplied by a constant coefficient and determined for each type of helicopter.

Another improvement of the invention consists in switching from one set of parameters to another, as a function of the flight data.

The fact that the equations (13) and (14) are only expressed by a linear combination of the input parameters and of the powers of these parameters and of their product, leads to a complementary object of the invention, namely the self-calibration possibility of the system implementing it.

The device for putting the above described method into practice uses a computing unit formed conventionally of an arithmetic unit carrying out elementary operations such as additions and multiplications and all operations necessary for the operation of the computer.

Moreover, this unit is capable of acquiring input information delivered by conventional sensors such as potentiometers, resolver.

Figure 4:
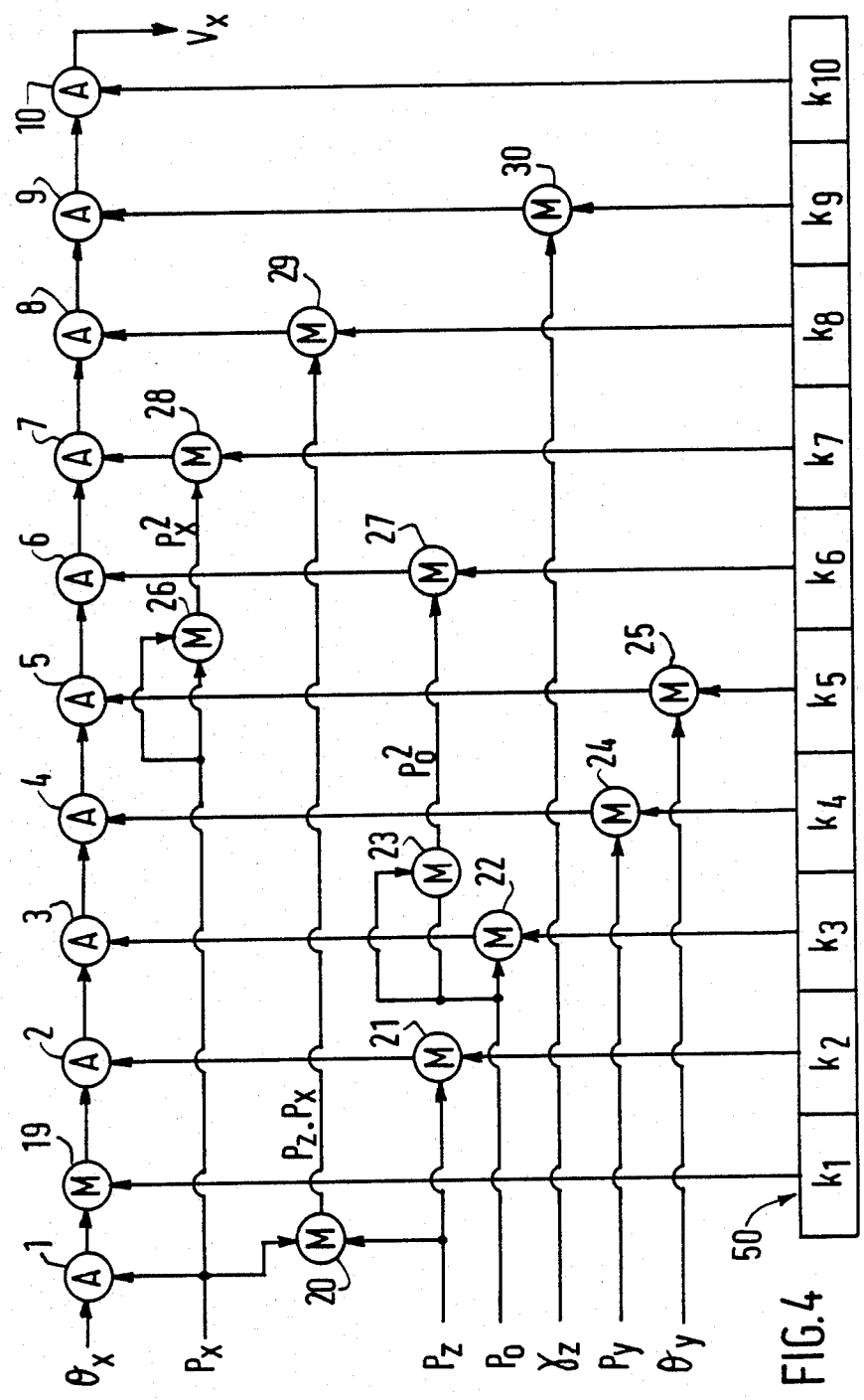
FIG. 4 is a flow chart for computing the longitudinal air speed of the helicopter.

The flowchart for computing Vx is shown in FIG. 4.

The input parameters are:
— $\theta x$, coming from an inclinometer or a conventional accelerometric case receiving the three accelerations of the helicopter $\gamma x$, $\gamma y$ and $\gamma z$ provided by three accelerometric cases whose axes are respectively the axes OX, OY, OZ of the helicopter, $\theta x$ being worked out by the computing unit of the case, in accordance with the following equations:

$$\theta x = \text{Arctg} \sqrt{\frac{\gamma x}{\gamma y^2 + \gamma z^2}} \simeq \text{Arcsin} \sqrt{\frac{\gamma x}{\gamma x^2\, \gamma y^2\, \gamma z^2}} \simeq \frac{\gamma x}{\gamma z}$$

— $\theta y$, coming from another inclinometer or accelerometric case and being worked out in accordance with the following equations:

$$\theta y = \text{Arctg} \sqrt{\frac{\gamma y}{\gamma x^2 + \gamma z^2}} \simeq \text{Arctg} \frac{\gamma y}{\gamma z} \simeq \frac{\gamma y}{\gamma z},$$

The inclinometers delivering $\theta x$ and $\theta y$ being situated in two orthogonal planes serving as measurement reference,
— Px, coming from a potentiometric sensor detecting the movement of the longitudinal cyclical pitch control,
— Py, coming from a potentiometric sensor detecting the movement of the transverse cyclic pitch contro,
— Pz, coming from a potentiometric sensor detecting movement of the antitorque device control,
Po, coming from a potentiometric sensor detecting movement of the control of the general collective pitch of the main rotor.

Figure 9:
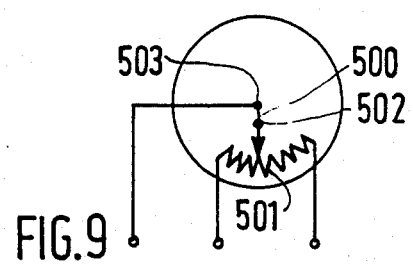
FIG. 9 is a diagram of a pendular clinometer.

Referring to FIG. 9, showing the diagram of a pendular clinometer or inclinometer, capable of supplying $\theta x$ and $\theta y$, and taking the example of $\theta x$, an arrow 500, carrying a weight 502, rotates freely about a point 503, substantially perpendicularly to the plane XOZ while placing itself in the gravity field: the point of arrow 500 rubs against a rheostat 501, which gives the angle $\theta x$.

Conventionally, the computer acquires the value of these parameters at the beginning of the computing cycle, and transforms them conventionally into a digital value. In what follows, the name of the parameter represents its digital value. The coefficients $k_1$ to $k_{10}$ are stored beforehand in a memory 50 (FIG. 4).

The computer takes $\theta x$, uses an adder 1 of gain $-1$ for subtracting it from Px, then multiplies the result by $k_1$, by means of the multiplier 19, which it takes it from memory 50. By means of adder 2 it adds the results to Pz, multiplies by $k_2$ by means of the multiplier 21 $k_2$ coming from the memory 50;

The result is added by adder 3 to Po, multiplied by $k_3$ which comes from memory 50;

The result is added by adder 4 to Py, multiplied by $k_4$, coming from memory 50, in multiplier 24; the result is added by adder 5 to $\theta y$ multiplied by $k_5$, coming from memory 50, in multiplier 25. To this result adder 6 adds Po multiplied once by itself by multiplier 23 and multiplied by $k_6$, coming from memory 50, by multiplier 27. To this result coming from adder 6, adder 7 adds Px multiplied once by itself by multiplier 26 and multiplied by $k_7$ from memory 50 in multiplier 28.

Moreover, Px and Pz are multiplied together by multiplier 20 and by $k_8$, from memory 50, in multiplier 29, which gives a result which is added to a result of adder 7 in adder 8. To this result the computer adds, by means of adder 9, $\gamma z$ multiplied by $k_9$ from memory 50 in multiplier 30. Finally, to this result the computer adds $k_{10}$, coming from memory 50, in adder 10. This final result is the value of the longitudinal speed Vx.

The computer delivers this value and then begins another cycle of computing Vx.

Figure 5:
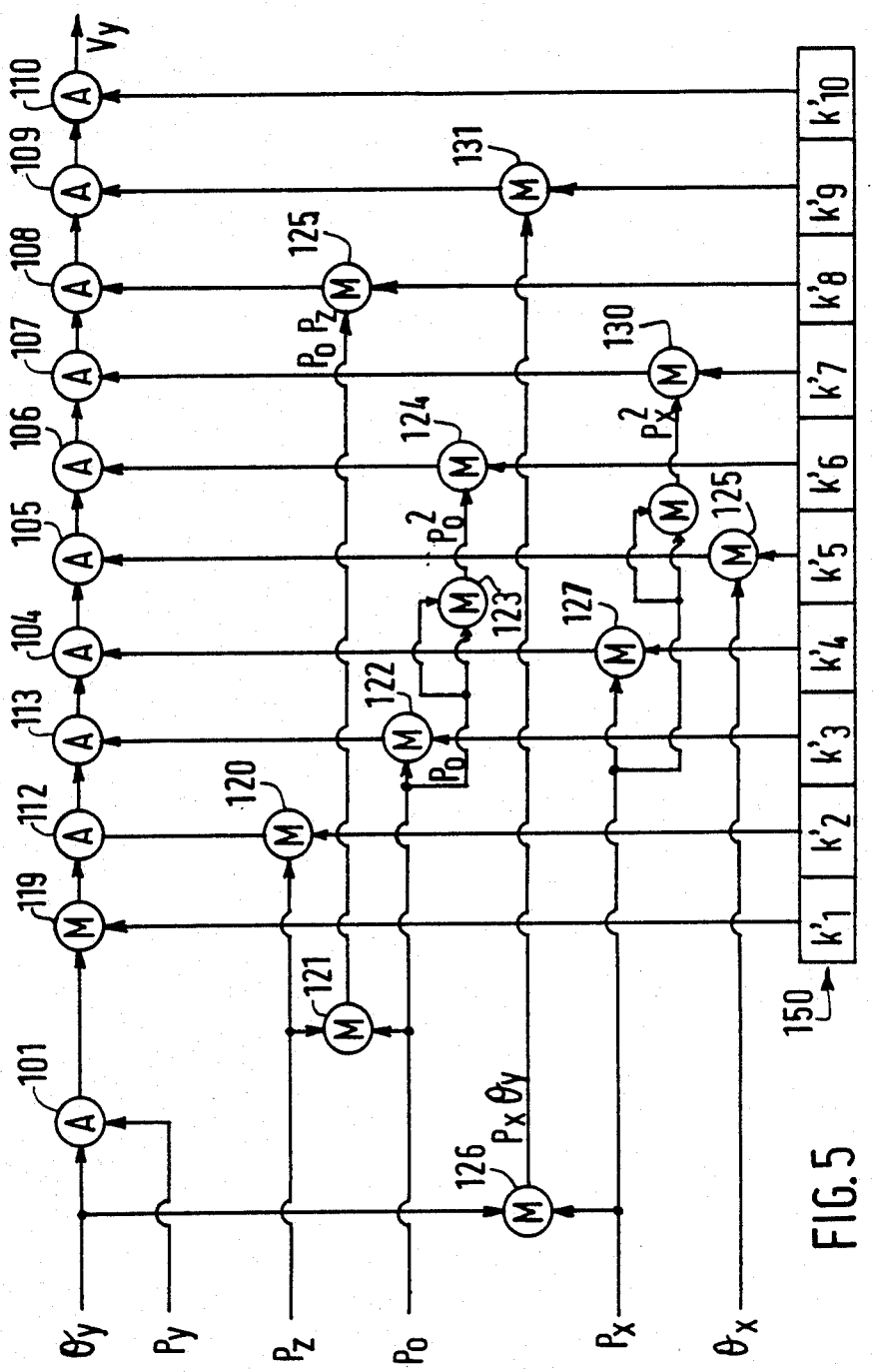
FIG. 5 is a flow chart for computing the lateral air speed of the helicopter.

The flowchart for computing Vy, as shown in FIG. 5, uses the above defined parameters.

The computer takes $\theta y$ and Py, subtracts them in adder 101 with gain $-1$, multiplies the result by $k'_1$, coming from memory 150, in multiplier 119. To this result it adds, in adder 102, Pz multiplied in multiplier 120 by $k'_2$ coming from memoty 150. To this result it adds, in adder 103, Po multiplied, in multiplier 122, by $k'_3$ coming from memory 150. To this result it adds, in adder 104, Px multiplied, in multiplier 127, by $k'_4$ coming from memory 150. To this result it adds, in adder 105, $\theta x$ multiplied, in multiplier 128, by $k'_5$ coming from memory 150. To this new result, it adds, in adder 106, Po multiplied once by itself, in multiplier 123, and, in multiplier 124, by $k'_6$, from memory 150. To this result it adds, in adder 107, Px multiplied once by itself, in multiplier 129 and, in multiplier 130, by $k'_7$ coming from memory 150. To this result it adds, in adder 108 the product of Po and Pz, obtained in multiplier 121, which product itself multiplied in multiplier 125 by $k'_8$ coming from memory 150. To this result it adds, in adder 109 the product of Px and $\theta y$, obtained in multiplier 126, and itself multiplied in multiplier 131 by $k'_9$ coming from memory 150. Finally, the computer adds to the preceding result, in adder 110, $k'_{10}$ coming from memory 150. This final result is the value of a speed Vy.

The computer delivers this value and begins another cycle for computing Vy.

The present invention also relates to the determination of the different coefficients $k_1$–$k_{10}$ and $k'_1$–$k'_{10}$, for computing the speeds Vx and Vy, that is to say the calibration of these functions or calibration of the computing system.

Conventionally, the calibration of a function Y of variables xi, in accordance with the equation $$Y = \sum_{i=1}^{i=n} a_i x_i,$$

That is to say the determination of the coefficients $a_i$, is achieved by measuring Y in N configurations, with $N > \eta$, as well as the corresponding variables xi, so as to obtain a multitude of points in a space with n dimensions and, by the method of least squares, cause a curve to pass through these points.

In the case in question, one of the conventional means for calibrating a system is to measure the air speed by another means, either by another anomometer or by knowledge of the wind and of the ground speed.

For each calibration flight case, we have:
—the values of the reference air speed,
—the value of the different sensitizing parameters (pitch, attitude, weight . . . ) acquired on the helicopter. Then a certain number of flight cases are effected for covering the flight range of the helicopter considered so as to have sufficient data for identifying the coefficients.

In the case of the model presented [equations (13) and (14)] two systems of N equations with 10 unknowns are therefore solved using a method of least squares, N being the number of sensitizing flight points.

Figure 6:
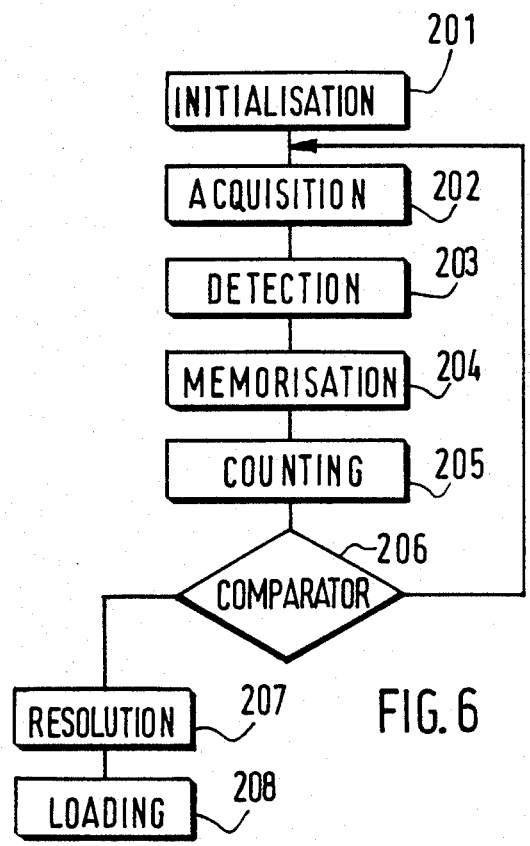
FIG. 6 is a flow chart illustrating the conventional calibration of the method of FIGS. 4 and 5.

The flow diagram of such a computation is shown schematically in FIG. 6.

An initialization device 201 is controlled before the calibration flight, either by the pilot or by an insert in the computer. The pilot carries out the flight which gives different sufficiently stabilized air speed values covering the whole flight range of the helicopter.

The computer acquires, by means of a conventional acquisition device 202, the parameters measured on the helicopter ($\theta x$, Px, Pz, Po, $\gamma z$, Py, $\theta y$) and the values Vx and Vy given by the air speed reference. Then by means of a conventional difference detection device 203, the computer makes sure that the set of values of the parameters thus acquired is sufficiently different from that acquired previously for the multitude of points to be the most perfect possible. It then increments a counting device 205. If the value of this counter is less than a given value N at the outset (necessarily greater than 10) in a comparator 206, the computer continues to acquire parameters. If not, for Vx and Vy the computer solves the twice N equations with twice 10 unknowns which are the coefficients $k_1$ to $k_{10}$ and $k'_1$ to $k'_{10}$ by means of a conventional device 207 for solving linear equations using the method of least squares. With the equations thus solved, the set of coefficients $k_1$ to $k_{10}$ are loaded into memories 50 and 150 using a conventional loading procedure 208.

This calibration method has however drawbacks. It in fact requires heavy means on the ground or airborne and it is operationally difficult to use. By way of example, a laser anemometer weighs more than 50 kg.

Under these conditions, as a variant, another calibration method is proposed based on the assumption that, between two stabilized flight configurations successive in time and so closely related, the variations of the air speed vector, in the ground reference frame, are equal to the variations of the ground speed vector. In other words, it is assumed that the wind vector remains constant between the two passes considered but, of course, not during the whole flight. Futhermore, use is made of the true attitude and true heading data of an airborne reference of the ground speed vector, all the computations being made in the earth's reference frame.

Thus, and in accordance with this method which does not require the wind vector, the coefficients k and k' are only determined by means of the airborne reference of the ground speed vector; we can then speak of a self calibration process.

As airborne reference, a Doppler radar system and a vertical gyro center or an inertial center, for example, may be used.

Vsx, Vsy, Vsz being the ground speeds of the helicopter along axes OZ, OY, OZ,

Vsn, Vse, Vsv being the ground speeds of the helicopter along the North, East, vertical axes of the earth's reference framework, Vax, Vay, Vaz being the air speeds of the helicopter along axes OX, OY, OZ Van, Vae, Vav being the air speeds of the helicopter along the North, East, vertical axes of the earth's reference framework.

The equations for passing over from the helicopter's reference frame to the earth's reference frame are written:

$$Vsn = p11\ Vsx + p12\ Vsy + p13\ Vsz \tag{15}$$
$$Vse = p21\ Vsx + p22\ Vsy + p23\ Vsz \tag{16}$$
$$Vsv = p31\ Vsx + p32\ Vsy + p33\ Vsz \tag{17}$$
$$Van = p11\ Vax + p12\ Vay + p13\ Vaz \tag{18}$$
$$Vae = p21\ Vax + p22\ Vay + p23\ Vaz \tag{19}$$
$$Vav = p31\ Vax + p32\ Vay + p33\ Vaz \tag{20}$$

with $p11 = \cos\psi\cos\theta$  $p12 = -\sin\psi\cos\psi + \cos\phi\sin\theta\sin\phi$
$p13 = \sin\psi\sin\phi + \cos\psi\sin\theta\cos\phi$
$p21 = \sin\psi\cos\theta$  $p22 = \cos\psi\cos\phi + \sin\psi\sin\theta\sin\phi$
$p23 = \sin\psi\sin\theta\cos\phi - \cos\psi\sin\phi$
$p31 = -\sin\theta$  $p22 = \cos\theta\sin\phi$  $p33 = \cos\theta\cos\phi$ $\psi$, $\theta$, $\phi$ being respectively the heading, the pitch attitude, or the pitch angle, and the roll angle given by the airborne reference.

From equations (17) and (20) we derive:

$$Vsz = \frac{1}{p13}(Vsv - p31\ Vsx - p32\ Vsy) \tag{21}$$

$$Vaz = \frac{1}{p13}(Vav - p31\ Vax - p32\ Vay) \tag{22}$$

From the equations (15), (16), (18), (19), (21), (22), we derive:

$$Vsn = q11\ Vsx + q12\ Vsy + q13\ Vsv \tag{23}$$
$$Vse = q21\ Vsx + q22\ Vsy + q23\ Vsv \tag{24}$$
$$Van = q11\ Vax + q12\ Vay + q13\ Vav \tag{25}$$
$$Vae = q21\ Vax + q22\ Vay + q23\ Vav \tag{26}$$

with $$\begin{cases} q11 = p11 - \frac{p13}{p33}p31 \\ q12 = p12 - \frac{p13}{p33}p32 \\ q22 = p22 - \frac{p23}{p33}p32 \\ q21 = p21 - \frac{p23}{p33}p31 \\ q13 = -\frac{p13}{p33}\ q23 = \frac{p23}{p33} \end{cases}$$

The speed of the helicopter with respect to the ground is expressed as the sum of the speed of the helicopter with respect to the air and the speed of the wind Vv $$Vsn = Van + Vvn \tag{27}$$
$$Vse = Vee + Vve \tag{28}$$
$$Vsv = Vav + Vvv \tag{29}$$

By replacing in the equations (27) and (28), Vsn, Van, Vse and Vae by their values given by the equations (23), (24), (25) and (26) we obtain:

$$q11\ Vsx + q12\ Vsy + q13\ Vsv = \tag{29}$$
$$q11\ vax + q12\ Vay + q13\ Vav + Vvn$$
$$q21\ Vsx + q22\ Vsy + q23\ Vsv = \tag{30}$$
$$q21\ Vax + q22\ Vay + q23\ Vav + Vve$$

When the component of the wind is zero, we may simplify the equations (29) and (30):

$$q11\ Vsx + q12\ Vsy = q11\ Vax + q12\ Vay + Vvn \tag{31}$$

$$q21\ Vsx + q22\ Vsy = q21\ Vax + q22\ Vay + Vve \tag{32}$$

If we write the equations (31) and (32) for two flight points sufficiently close in time for the wind to be constant between these two points, we obtain by subtracting from the right and left sides of equation 31, respectively 32, written for the flight point (1) the equation 31, respectively 32, written for the flight point (2)

$$q11\ (1)\ Vsx\ (1) - q11\ (2)\ Vsx\ (2) + \tag{33}$$
$$q12\ (1)\ Vsy\ (1) - q12\ (2)\ Vsy\ (2) = q11\ (1)\ Vax\ (1) -$$
$$q11\ (2)\ Vax\ (2) + q12\ (1)\ Vay\ (1) - q12\ (2)\ Vay\ (2)$$
$$q21\ (1)\ Vsx\ (1) - q21\ (2)\ Vsx\ (2) + \tag{34}$$
$$q22\ (1)\ Vsy\ (1) - q22\ (2)\ Vsy\ (2) = q21\ (1)\ Vax\ (1) -$$
$$q21\ (2)\ Vax\ (2) + q22\ (1)\ Vay\ (1) - q22\ (2)\ Vay\ (2)$$

the symbols (1) and (2) indicating that the parameter is measured in a first flight condition and in a second flight condition, respectively.

Having expressed the equations (13) and (14) in the following simplified form:

$$Vax = \Sigma k_j \lambda_j \tag{43}$$

$$Vay = \Sigma k'_j \mu_j \tag{44}$$

by replacing in (33) and (34) Vax and Vay by their values given by the relationships (43) and (44), we obtain:

$$q11\ (1)\ Vsx\ (1) - q11\ (2)\ Vsx\ (2) + q12\ (1)\ Vsy\ (1) - \tag{35}$$
$$q12\ (2)\ Vsy\ (2) = \Sigma k_j\ (q11\ (1)\ \lambda_j\ (1) - q11\ (2)\ \lambda_j\ (2)) +$$
$$\Sigma k'_j\ (q12\ (1)\ \mu_j\ (1) - q12\ (2)\ \mu_j\ (2))$$
$$q21\ (1)\ Vsx\ (1) - q21\ (2)\ Vsx\ (2) + q22\ (1)\ Vsy\ (1) - \tag{36}$$
$$q22\ (2)\ Vsy\ (2) = \Sigma k_j\ (q21\ (1)\ \lambda_j\ (1) - q21\ (2)\ \lambda_j\ (2)) +$$
$$\Sigma k'_j\ (q2\ (1)\ \mu_j\ (1) - q22\ (2)\ \mu_j\ (2))$$

This means that twice more flight points are required than in direct calibration and so at least 20 points, for determining the twice 10 unknowns which are the coefficients k and k'. It is in this sense that we may say that in the self calibration each flight configuration of the direct calibration is divided into two. The resolution is provided by a linear equation resolution method in the meaning of the least squares, as in the case of direct calibration.

This calibration procedure is achieved by the processing unit which is used for computing the two air speeds. A special mode is provided, in this unit, for initiating this procedure and for carrying it out during flight in real time.

The set of coefficients k and k' is then stored in the device and the two speeds are computed continuously, as in the conventional procedure.

Figure 7:
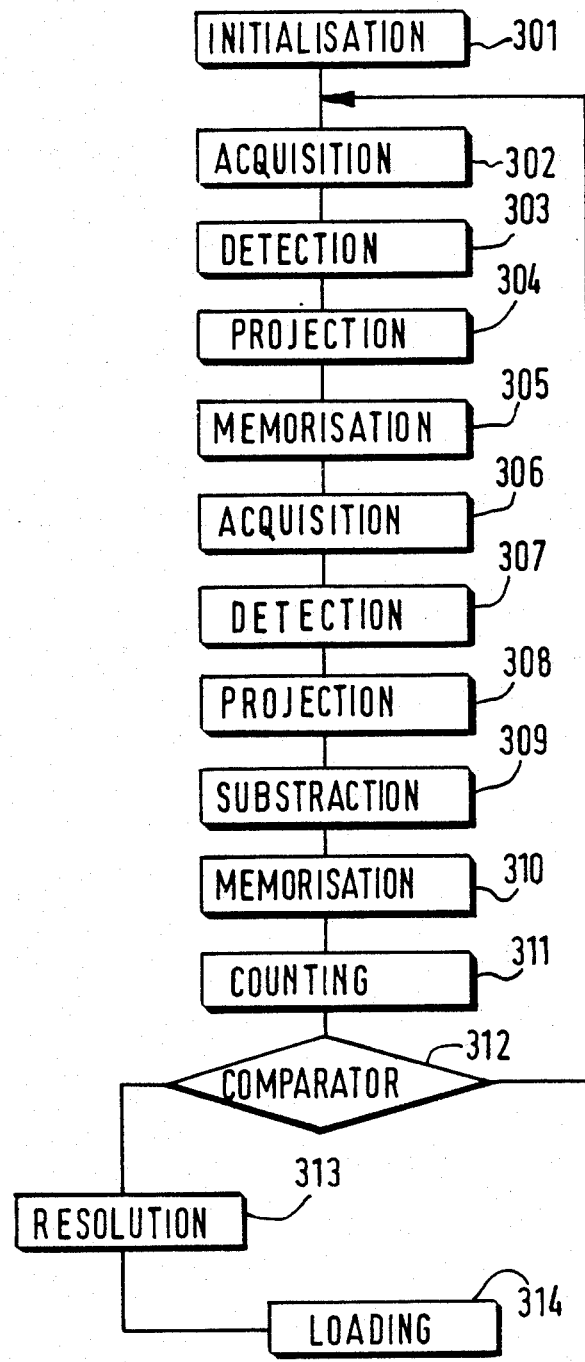
FIG. 7 is a flow chart illustrating the self-calibration of the invention.

The computing flow chart is shown in FIG. 7. An initialization device 301 is controlled before the self-calibration flight either by the pilot, or by a programming insert in the computer. The pilot makes the flight which provides different air speed values.

The computer acquires, using an acquisition procedure 302 identical to the procedure of the conventional method, the parameters measured on the helicopter ($\theta x$, Px, Pz, Po, $\gamma z$, Py, $\theta y$), the values of the reference ground speeds and the true attitude and heading values of the helicopter. Then the computer, using a conventional difference detection device 303, makes sure that the set of parameters thus acquired is sufficiently different from the preceding ones. The set considered is then stored by a conventional procedure 305, after projection, that is to say computation of the coefficients of the equations (33) and (34) by a procedure 304.

The computer then acquires, by means of an acquisition procedure 306 which may be the same as procedure 302, a new set of values of the same coefficients as before, makes sure by means of a difference detection procedure 307 which may be the same as procedure 303 that the set of parameters thus acquired is sufficiently different from the preceding ones. The set is then projected by a procedure 308 which may be the same as the procedure 304.

The computer then subtracts, using a simple procedure 309, the values of the parameters thus found from those acquired just before, then stores the result using a procedure 310.

It then increments a counting device 311. If the value of this counter is less than a given value N at the outset (necessarily greater than 20) in a comparator 312, the computer continues to acquire parameters. If not, the computer resolves the 2×N equations with twice 10 unknowns which are the parameters $k_1$-$k_{10}$ and $k'_1$-$k'_{10}$ using a conventional linear equation resolution procedure 313 in the meaning of least squares. This resolution being finished, the set of coefficients $k_1$-$k_{10}$ and $k'_1$-$k'_{10}$ are loaded into memories 50 and 150 using a conventional loading procedure 314.

Other sets of coefficients may be calculated and stored in the same way for other flight or external loading configurations.

By way of example, the following set of parameters was determined on a helicopter.

Figure 8:
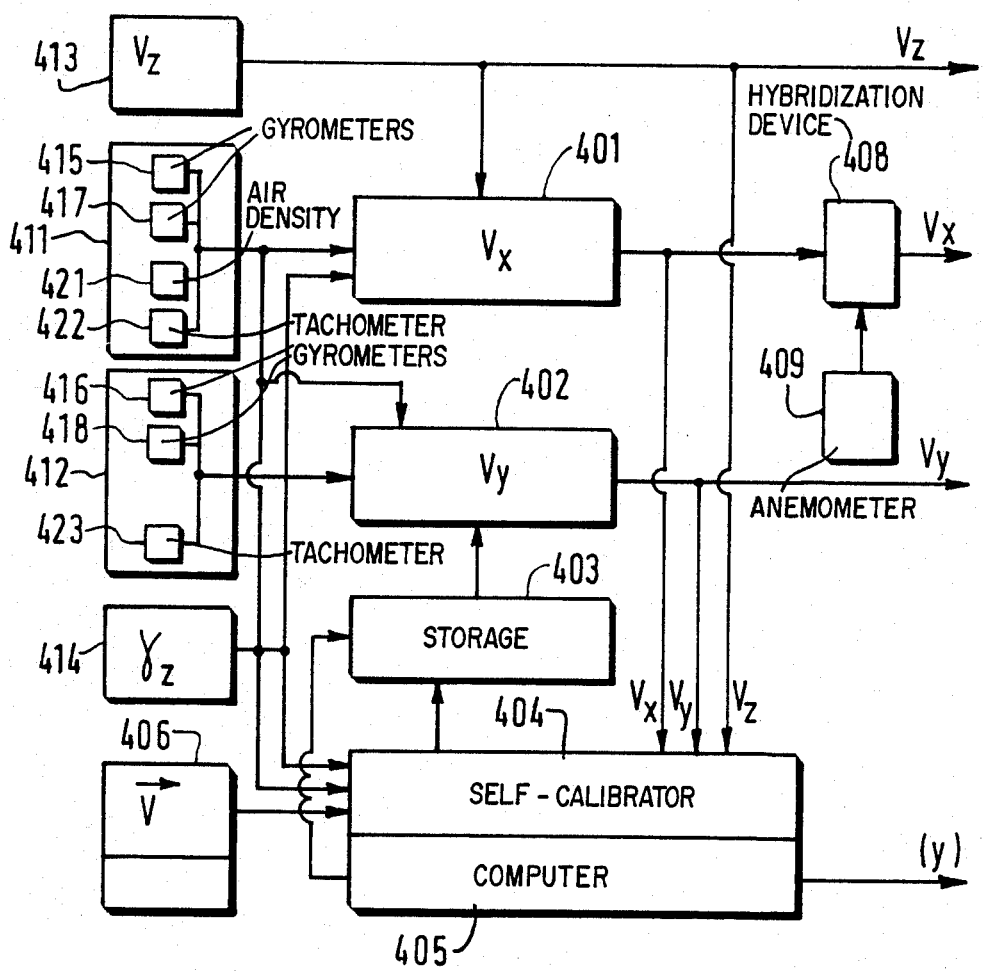
FIG. 8 is one schematical embodiment of the system of the invention.

$k_1 = 4.71$ m/s/deg
$k'_1 = 1.06$/m/s/deg
$k_2 = 0.42$ m/s/deg
$k'_2 = 3.22$ m/s/deg
$k_3 = 14.95$ m/s/deg
$k'_3 = 5.03$ m/s/deg
$k_4 = 0.65$ m/s/deg
$k'_4 = 0.55$ m/s/deg
$k_5 = 0.26$ m/s/deg
$k'_5 = 0.44$ m/s/deg
$k_6 = 0.60$ m/s/deg$^2$
$k'_6 = 0.24$ m/s/deg$^2$
$k_7 = 0.13$ m/s/deg$^2$
$k'_7 = 0.03$ m/s/deg
$k_8 = 0.02$ m/s/deg$^2$
$k'_8 = 0.21$ m/s/deg$^2$
$k_9 = 1.87$ s
$k'_9 = 0.03$ m/s/deg
$k_{10} = 4.71$ m/s/deg
$k'_{10} = 20.94$ m/s FIG. 8 shows one embodiment of a complete device of the invention.

We find at the input of the device and for the axes OX and OY, respectively at 411 and 412, the influence parameters such as:
— the rotor pitches, given by potentiometric sensors,
— the control of the antitorque device,
— the weight of the helicopter, supplied by the constructor and the load, including the weight of the fuel,
— the density of the air (421), supplied by static pressure and temperature sensors,
— the roll and pitching speeds supplied by gyrometers (415, 416 and 417, 418),
— the speed of the rotation of the main rotor delivered by a tachometer (422, 423), as well as the vertical speed Vz coming for example from a variometer 413 and the vertical acceleration $\gamma z$, coming from an accelerometer 414.

The computation of Vx and Vy is provided respectively by the devices 401 and 402 such as described above, from the preceding influence parameters and the set (sets) of coefficients stored at 403.

These sets of coefficients 403 come from the self-calibrator 404 already described with reference to FIG. 7 and controlled by computer 405.

This self-calibrator 404 receives the influence parameters as well as the ground speed vector information supplied for example by an inertial gyrocenter 406 or a conventional Doppler radar system and a vertical gyrocenter for the altitudes.

It also receives the information output by the devices computing Vx and VY, which gives the possibility of permanent self-calibration during flight.

A hybridization device 408 receives essentially the information Vx, and possiblly Vy, as well as the air speed V supplied by a conventional anemometer 409 which is only accurate for high speeds for example greater than 40 knots. This device 408, as a function of the real flight speed, makes the choice of the speed Vx to be supplied:
— either Vx such as calculated by device 401,
— or Vx such as calculated by the anemometer 049, which takes into account the temperature,
— or a weighted mean of these two values.

The computer 405 monitors and controls all the operations described and supplies conventionally information concerning the validity of the calculated information and the state of the system.

The above described device allows accurate and complete measurements to be obtained of the air speed of a helicopter throughout its flight envelope and may be calibrated solely by the internal means of the helicopter. The set of particular coefficients used is optimized for the whole flight envelope of the helicopter. As mentioned, several sets of such coefficients may be stored and used successively, if each set corresponds to only a part of the flight envelope, or all for the whole flight envelope, each set of coefficients then corresponding to a given configuration of the external loads of the helicopter.

Throughout the above description, it has been considered that the axis OZ of the hub of the main rotor was perpendicular to the axes OX, OY. It is obvious that it is not always so, even if it is often the case, the hub of the rotor being possibly "set" with respect to the straight line orthogonal to the axes OX, OY. This would in no wise be a departure from the scope of the present invention.

What is claimed is:

1. A method for determining the air speed of a helicopter having a main lift rotor and an antitorque device, with a longitudinal axis OX, a transverse axis OY and an axis of the hub of the rotor OZ, a swash plate being provided for varying the longitudinal cyclic pitch Px, the transverse cyclic pitch Py and the collective pitch Po of the main rotor, in which method the two components Vx and Vy of said speed are measured along the axes OX and OY, respectively, as a function of the difference between the cyclic pitch (Px, Py) along the axis considered (OX, OY) and the angle of bank ($\theta x$, $\theta y$) of the helicopter about the other axis (OY, OX), wherein Vx and Vy are determined by solving the equations:

$$Vx = k_1(P_x - \theta_x) + k_7P_x^2 + K_8P_xP_z + k_4P_y + k_5\theta_y +$$
$$k_2P_z + k_9\gamma_z + k_3P_o + k_6P_o^2 + k_{10}$$

$$Vy = k'_1(P_y - \theta_y) + k'_7P_x^2 + k'_8P_xP_z + k'_4P_x + k'_5\theta_x +$$
$$k'_2P_z + k'_9P_x\theta_y + k'_3P_o + k'_6P_o^2 + k'_{10}$$

in which $P_z$ is the pitch of the antitorque device, $\gamma_z$ is the vertical acceleration of the helicopter along the axes OZ, $k_1$-$k_{10}$ and $k'_1$-$k'_{10}$ are parameters, fixed or variable, depending on the type of helicopter and determined by calibration, and once Vx and Vy are determined, deducing the air speed of the helicopter therefrom and using same for piloting the helicopter.

2. The method as claimed in claim 1, wherein, the parameters k and k' are given by the relationships:

$$k_1 = \frac{\Omega R}{\frac{4}{3}P_o + \frac{8\omega}{5.7} + \frac{Cd}{\omega}}$$

$$k_1' = \frac{1}{\frac{4}{3}P_o + \frac{8\omega}{5.7} + \frac{Cd}{\omega}}$$

in which:

$\Omega$ is the speed of rotation of the main rotor,

R is the radius of the main rotor, $\omega$ is the weight W of the helicopter along the vertical, reduced by the term $\rho nc \Omega R$, Cd is the mean drag of the blades, $\rho$ is the density of the air at the location where the helicopter is situated, n is the number of blades of the main rotor, c is the chord of the blades of the main rotor, the axis OZ of the hub of the main rotor being perpendicular to the axes OX, OY.

3. The method aas claimed in claim 2, wherein the parameters $k_2$-$k_{10}$ and $k'_2$-$k'_9$ are considered as zero and $k'_{10}$ is taken as given by the relationship:

$$k_{10}' = \frac{k \, tr \cos\phi - \sin\theta}{\frac{4}{3}P_o + \frac{8\omega}{5.7} + \frac{Cd}{\omega}}$$

in which k is a constant dependin on the type of helicopter, tr is the reduced thrust of the antitorque device, reduced by the term $\rho \, nc \, \Omega^2 R^3$, $\phi$ is the roll angle of the helicopter.

4. The method as claimed in claim 1, wherein the parameters $k_1$-$k_{10}$ and $k'_1$-$k'_{10}$ are considered as constants.

5. A system for carrying on the method as claimed in claim 1, for determining the air speed of the helicopter having a main lift rotor and an antitorque device, with a longitudinal axis OX, a transverse axis OY and an axis of the hub of the rotor OZ, a swash plate being provided for varying the longitudinal cyclic pitch Px, the transverse cyclic pitch Py and the collective pitch Po of the main rotor, which system further comprises an accelerometer giving the vertical acceleration $\gamma z$, along the axis OZ, of the helicopter, inclinometers giving the angles of tilt $\theta x$ and $\theta y$ of the helicopter about the axes OY and OX, respectively, sensors detecting the movement of the control of the longitudinal Px and transverse Py cyclic pitches, a sensor detecting the movement of the control of the antitorque device Pz, a sensor detecting movement of the control of the collective pitch Po of the main rotor, a device for calibrating the system for determining the coefficients $k_1$-$k_{10}$ and $k'_1$-$k'_{10}$ of the relationships giving the values of the longitudinal Vx and transverse Vy components of the air speed of the helicopter, means for storing these coefficients, and a computer for acquiring the parameters $\gamma z$, $\theta x$, $\theta y$, Px, Py, Pz and Po and, by means of said coefficients, implementing said relationships giving Vx and Vy.

6. The system as claimed in claim 5, wherein a variometer is provided giving the vertical speed Vz of the helicopter and a device for determining the ground speed of the helicopter.

7. The system as claimed in claim 6, wherein a prior art anemometer is provided and a hybridization device for selecting one, or the other, or a combination of the two values of the air speed delivered by the computer and the anemometer, respectively.

8. The system as claimed in claim 5, wherein sensors are provided for detecting the roll and pitch speeds of the helicopter, the density of the air and the rotational speed of the main rotor of the helicopter.

9. A method for calibrating a system for determining the air speed V of a helicopter of the linear form $$V = \sum_{i=1}^{i=n} a_i x_i,$$

the $x_i$ being n variables, representative of different sensitization parameters of the helicopter, to which the n multiplying coefficients $a_i$ are applied respectively, in which method the n coefficients $a_i$ are determined by solving a system of N linear equations with n unknowns of the form $$V = \sum_{i=1}^{n} a_i x_i,$$

N being the number of main flight configurations of the helicopter in which said sensitizing parameters of the helicopter are measured in the reference frame of the helicopter and the values of said N variables $x_i$ are calculated, in which calibration method the true attitude and heading of the helicopter are determined, each main flight configuration is split into a pair of elementary configurations closely related to each other so as to assume that the wind is the same in these two elementary configurations and, for each pair of elementary configurations, the ground speed of the helicopter is measured, in the two elementary configurations, whose variations are assimilated with those of its air speed, as well as the sensitizing parameters of the helicopter, which are transposed from the reference frame of the helicopter into the earth's reference frame and the equation, obtained by substracting the equations relative to the two elementary configurations one from the other, in the left and right hand sides of the equations, is considered (or taken) as the equation of the system of N equations to be solved.

10. The calibration method as claimed in claim 9, wherein, the system of N equations with n unknowns is solved by the method of least squares.

* * * * *